United States Patent [19]

Schneider

[11] Patent Number: 4,640,127

[45] Date of Patent: Feb. 3, 1987

[54] ELECTROTHERMAL MEASUREMENT OF LEVELS COMPENSATED FOR AMBIENT TEMPERATURE

[75] Inventor: Dieter Schneider, Frankfurt am Main, Fed. Rep. of Germany

[73] Assignee: VDO Adolf Schindling AG, Frankfurt am Main, Fed. Rep. of Germany

[21] Appl. No.: 729,493

[22] Filed: May 1, 1985

[30] Foreign Application Priority Data

Jun. 28, 1984 [DE] Fed. Rep. of Germany ....... 3423802

[51] Int. Cl.$^4$ .............................................. G01F 23/24
[52] U.S. Cl. ..................................... 73/295; 219/492; 307/118; 364/509
[58] Field of Search .................. 374/142, 102, 164; 73/295, 304 R; 307/118; 364/509; 219/492, 493

[56] References Cited

U.S. PATENT DOCUMENTS

| | | | |
|---|---|---|---|
| 3,947,665 | 3/1976 | Hundley | 364/509 X |
| 4,116,045 | 9/1978 | Potter | 73/295 X |
| 4,118,779 | 10/1978 | Tanei et al. | 364/509 |
| 4,425,795 | 1/1984 | Albrecht et al. | 73/295 |
| 4,513,616 | 4/1985 | Bezard et al. | 364/509 |
| 4,525,792 | 6/1985 | Clinton | 307/118 X |

FOREIGN PATENT DOCUMENTS 2740289 4/1981 Fed. Rep. of Germany.

OTHER PUBLICATIONS

Method & Apparatus for the Electrothermal Measurement of Level Compensated for Ambient Temperature, D. Schneider, SAE Conference Sensors & Actuators, pp. 1-9.

*Primary Examiner*—Daniel M. Yasich
*Attorney, Agent, or Firm*—Martin A. Farber

[57] ABSTRACT

In a method for the electrothermal measurement of level which is compensated for ambient temperature and in which a resistance probe is heated with a constant current in each case during a heating time, a comparison is effected between a first variable formed from at least one probe voltage at the start of the heating time and a second variable formed from at least one probe voltage at the end of the heating time. The forming of at least one of the two variables is effected in accordance with a time function. In order to reduce the influence of disturbing effects and, in particular, voltage noise pulses, the first variable is formed by integration of the probe voltages from the start of the heating time up to the middle of the heating time. The second variable is then formed by integration of the probe voltages from the middle of the heating time until its end. The two integrals are then subtracted from one another to produce a measurement value.

7 Claims, 6 Drawing Figures

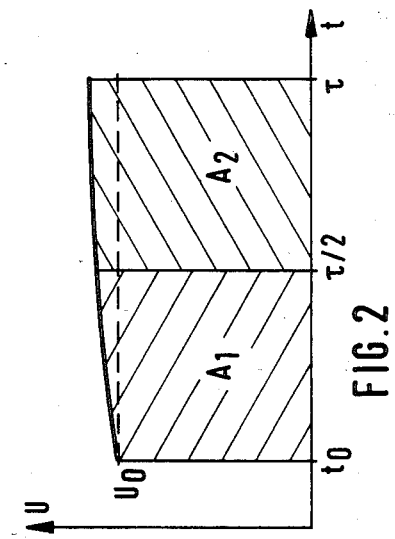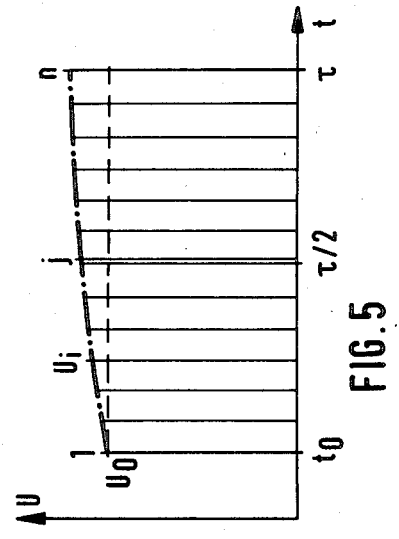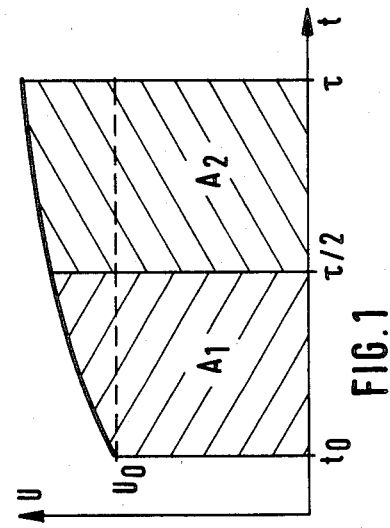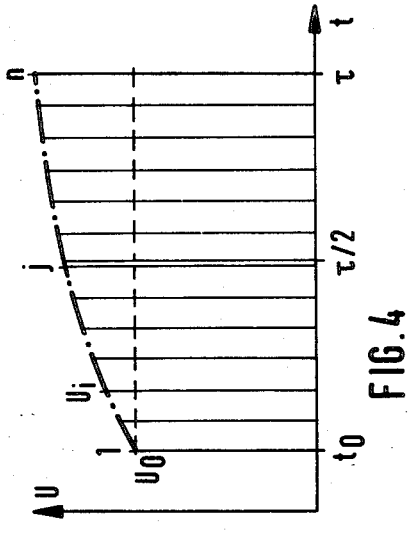

ELECTROTHERMAL MEASUREMENT OF LEVELS COMPENSATED FOR AMBIENT TEMPERATURE

BACKGROUND OF THE INVENTION

The invention concerns a method for the electrothermal measurement of level which is compensated for ambient temperature and in which a resistance probe is heated with a constant current in each case during a heating time, a first variable formed from at least one probe voltage at the start of the heating time is compared with a second variable formed from at least one probe voltage at the end of the heating time in order to form a comparison variable which is approximately proportional to the level, the forming of at least one of the two variables being effected in accordance with a time function.

Another aspect of the invention concerns a circuit for the electrothermal measurement of level compensated for ambient temperature, having a switched source of constant current on a resistance probe, a comparator which compares a first variable formed from at least one probe voltage at the start of the heating time with a second variable formed from at least one probe voltage at the end of the heating time, and means for forming at least one of the two variables in accordance with a time function.

It is known that the level of liquids can be measured with a resistance probe which consists of an elongated temperature-dependent resistor of positive temperature coefficient. This resistance probe is heated by a constant current. The heat produced in this way is given off to the environment corresponding to a heat transfer resistance which is dependent on the extent to which the resistance probe is immersed in the liquid medium or surrounded by the gaseous medium. The heating of the resistance probe results in an increase in its resistance during the heating time. The change of the resistance with time depends in this connection on the initial resistance of the resistance probe, the temperature coefficient, the constant current and the heat transfer resistance. The dependence on temperature of the initial resistance at the start of the constant current, when the latter can still not affect the increase in resistance, must be compensated for in order to obtain more accurate measurements of the level.

This will be discussed further below. Assuming that the temperature coefficient and the constant current are constant during the measurement, the variation with time of the resistance is dependent on the heat transfer resistance and the depth of immersion in the liquid medium. From the change in resistance there results a change in the probe voltage, which change is evaluated. The evaluation also affects the precision of the measurement. The methods of evaluation known up to the present time utilizethe change with time of the probe voltage by a differentiation or by determining the voltage difference after a given period of time, i.e. as a rule at the start and end of the heating time, in order to determine the depth of immersion.

If the resistance probe is allowed to cool down for a sufficiently long period of time by disconnecting the constant current, then repeated measurements during measurement periods are possible.

In one such known circuit, the resistance probe is connected, controlled by a program control (delay circuit), upon the commencement of each measurement (commencement of a measurement period) to a source of constant current which remains connected during the heating time. The delay circuit is connected to a comparator. The comparator is connected, on the one hand, to an inverter which is connected to the resistance probe and a resistor/capacitor member connected in parallel thereto, in such a manner that the comparator gives off an output signal to a monitoring device as soon as the voltage drop over the resistor/capacitor member is equal to that of the inverter (Federal Republic of Germany OS No. 27 40 289). The principle of measurement is in its turn based on the measurement of that change in the resistance of the resistance probe, which is surrounded to a greater or lesser extent by the fluid to be measured, which is brought about at the end of aheating time by a constant current. Ordinarily, in this case the difference between the voltage $U_1$ at the end of the heating time and an initial voltage $U_0$ at the beginning of the heating time is detached. In order for the result of this measurement to be independent of the ambient temperature, this prior art specifically provides for the following: At the time of the connection of the resistance probe, the inverter supplies a voltage $V-U_0$ which charges the capacitor of the resistor/capacitor member. The latter then discharges in accordance with a known law which is determined by the resistance and the capacitance. If the resistance probe heats up during the further course of the heating time, the voltage $U$ increases and the inverter supplies a voltage of the form $V-U$, which is dependent on the depth of immersion of the resistance probe. By means of the comparator, the time is determined at which the voltage curve of the capacitor (charge curve) which can be represented as a straight line, intersects the curve of the inverted voltage $V-U$. At a time determined by the program control, the comparator is switched in such a manner that a comparison is effected between the value of the inverted voltage $V-U_0$ at the terminals of the resistor/capacitor member and the value of the voltage present on the inverter. A monitoring device, which is connected to the output of the comparator, can in this case give off an alarm if a predeterminable threshold value is exceeded. In general, the level of the liquid can be indicated by digital or analog display instruments in accordance with this prior art.

In order to improve the precision of the electrothermal measurement of level compensated for ambient temperature at little expense it has also already been proposed, in a circuit having a comparator which compares a first variable formed from an initial voltage on the resistance probe at the start of a heating time with a second variable formed from a heating voltage at the end of a heating time, the forming of at least one of the two variables being effected in accordance with a time function determined by a resistor and capacitor, to connect the resistor and the capacitor together with an operational amplifier as integrator whose input can be coupled via a sample and hold member for the initial voltage to the resistance probe and whose output is connected to a first input of a comparator. The second input of the comparator is, in this case, coupled with the resistance probe via another sample and hold member directly for the forwarding of the heating voltage at the end of a heating time. A pre-settable backward counter for determining the time between actuation of the second sample and hold member and the switching of the comparator is connected to one output of the comparator. This circuit therefore measures the level as approximately proportional time (German patent application No. P 34 08 824.5 filed Mar. 10, 1984 corresponding to U.S. patent application Ser. No. 710,168 filed Mar. 11, 1985, neither of these documents being prior art).

In order to compensate for the temperature upon the electrothermal measurement of level, it is furthermore known to use a separate compensation resistor which is connected, in series with the resistance probe, to one input of an inverting amplifier. (VDO Paper, Haub et al. SAE Conference on Sensors and Activaters). The compensation resistor is preferably arranged in the vicinity of the resistance sensor and traversed by as small a current as possible in order to avoid heating. If however, the compensation resistor is arranged in the vicinity of the resistance sensor within the container, it is then necessary to lead out an additional connection. Furthermore, it is difficult to find a compensation resistor which has the same temperature coefficient as the measurement sensor.

However, all of the methods and circuits discussed above, have the disadvantage that, in them, noise pulses of the current supply, such as frequently occur in particular in automotive vehicles, have a disadvantageous effect on the result of the measurement.

It is an object of the invention to develop a method of the above-mentioned type in such a way that noise pulses of the supply voltage, which can act differently on the probe voltage at the start of the heating time and at the end of the heating time, distort the result of the measurement as little as possible. The precision and reproducibility of each individual measurement is to be increased by this method.

SUMMARY OF THE INVENTION

According to the invention, the first variable is formed by integration of the probe voltages (U) from the start of the heating time ($t_0$) until the middle ($\tau/2$) of the heating time, whereupon the second variable is formed by integration of the probe voltages from the middle of the heating time ($\tau/2$) until the end thereof ($\tau$).

In accordance therewith, therefore, no longer are only a single probe voltage at the start of the heating time and a single probe voltage at the end of the heating time evaluated. Rather, the probe voltages are integrated from the start of the heating time upon the connecting of the resistance probe to the source of constant current first of all until the middle of the heating time and returned as first variable for the subsequent evaluation. The probe voltages are then integrated from the middle of the heating time until the end thereof, whereby a second variable is formed. The difference between these two integrals is a measure of the depth of immersion.

In contradistinction to the earlier proposals, therefore, instead of a single probe voltage, in particular the initial voltage, being integrated, the probe voltages over, in each case, half of the heating time are integrated. By the integrating of the probe voltages, the influence of many disturbances on the result of the integration counteract each other while other disturbances, such as permanent zero-point deviations (offset), can no longer affect the result of the measurement as they could in the previously known or proposed methods.

The precision and reproducibility of the individual measurements during a heating time are therefore substantially improved by this method.

Further according to the invention, the integration process for each variable can be carried out continuously during in each case one-half of the heating time (FIGS. 1, 2). For the carrying out of this method there are used, in particular, analog circuits which can be constructed inexpensively for integration.

The integration process for each variable during in each case one-half of the heating time can, however, also be effected by summation of discrete probe voltages (FIGS. 4, 5). This last-mentioned method is particularly suitable for digitally operating devices, which are advisable in view of the fact that further functions, such as those of a program control and of the storing of the result of the comparison of the variables formed by integration, are to be effected.

Despite the high precision and great reproducibility of the individual measurements during a heating time, the measurement result can be improved in this case also by subsequent formation of the average value over a plurality of comparison variables, i.e. heating times.

The methods of the invention can be suitably carried out with a circuit in which an integrator (5) for the forming of each of the two variables is provided, the input of which integrator can be coupled to the resistance probe (3) via a controlled switch (6) from the start ($t_0$) of the heating time until the middle ($\tau/2$) of the heating time for integration for the first variable and be coupled to the resistance probe (3) from the middle of the heating time ($\tau/2$) until the end thereof ($\tau$) for integration for the second variable. This circuit is characterized by low expense as compared with the high precision and reproducibility of the individual measurements.

In case of analog measurement, the expense can be kept particularly low in the manner that the input of the integrator (5) during in each case one-half of the heating time can be coupled to the resistance probe (3) via an inverter (7) and can be coupled directly during, in each case, the other half of the heating time so that the integrator (5) forms the comparator. In this way, a single integrator is used not only for integration of the probe voltages during in each case one-half of the heating time but also for the subtraction of the probe voltages integrated during the second half from the probe voltages integrated during the first half of the heating time.

In a digital circuit in which the resistance probe (3) is connected via an analog-digital converter (17) to an adder for the addition of the discrete digitalized probe voltages during in each case one-half of the heating time, the integration is approximated by addition of probe voltages which are read and digitalized rapidly one after the other. The evaluation of these summed discrete probe voltages can be carried out with particularly high precision.

BRIEF DESCRIPTION OF THE DRAWINGS

With the above and other objects and advantages in view, the present invention will become more clearly understood in connection with the detailed description of a preferred embodiment, when considered with the accompanying drawings, of which:

FIGS. 1 and 2 are time diagrams of a continuous integration of the probe voltages for analog evaluation with empty tank (FIG. 1) and full tank (FIG. 2);

FIGS. 4 and 5 are time diagrams for the addition of discrete probe voltages with an empty tank (FIG. 4) and a full tank (FIG. 5)

DETAILED DESCRIPTION OF THE PREFERRED EMBODIMENT

FIG. 1 shows how the probe voltages U typically vary as a function of the time in accordance with a fitted function. At the time $t_0$ upon the connection of a resistance probe, the voltage drop $U_0$ occurs on the latter as initial voltage at the start of the heating time. The probe voltage then increases in accordance with the fitted function up to the time $\tau$. FIG. 1 shows that the probe voltages rise relatively strongly due to the high heat transfer resistance in the case of an empty tank.

The level is determined in the manner that the probe voltages are first integrated between the times $t_0$ and $\tau/2$ (area $A_1$) and then between the times $\tau/2$ and $\tau$ (integral $A_2$). By subtraction of the integral $A_2$ minus $A_1$ one then obtains a measure of the level. In this connection, disturbing influences which affect the probe voltages U are substantially eliminated.

FIG. 2 shows the analog measurement and evaluation method as in FIG. 1, but for a full tank. It can be noted from the course of the probe voltage that the heat transfer resistance is small, i.e. the probe voltages increase only slightly. Accordingly, the difference between integral $A_2$ minus $A_1$ of the probe voltages between $\tau/2$ and $\tau$, on the one hand, and $t_0$ and $\tau/2$ is smaller than in the case of, the empty tank according to FIG. 1.

Figure 3:
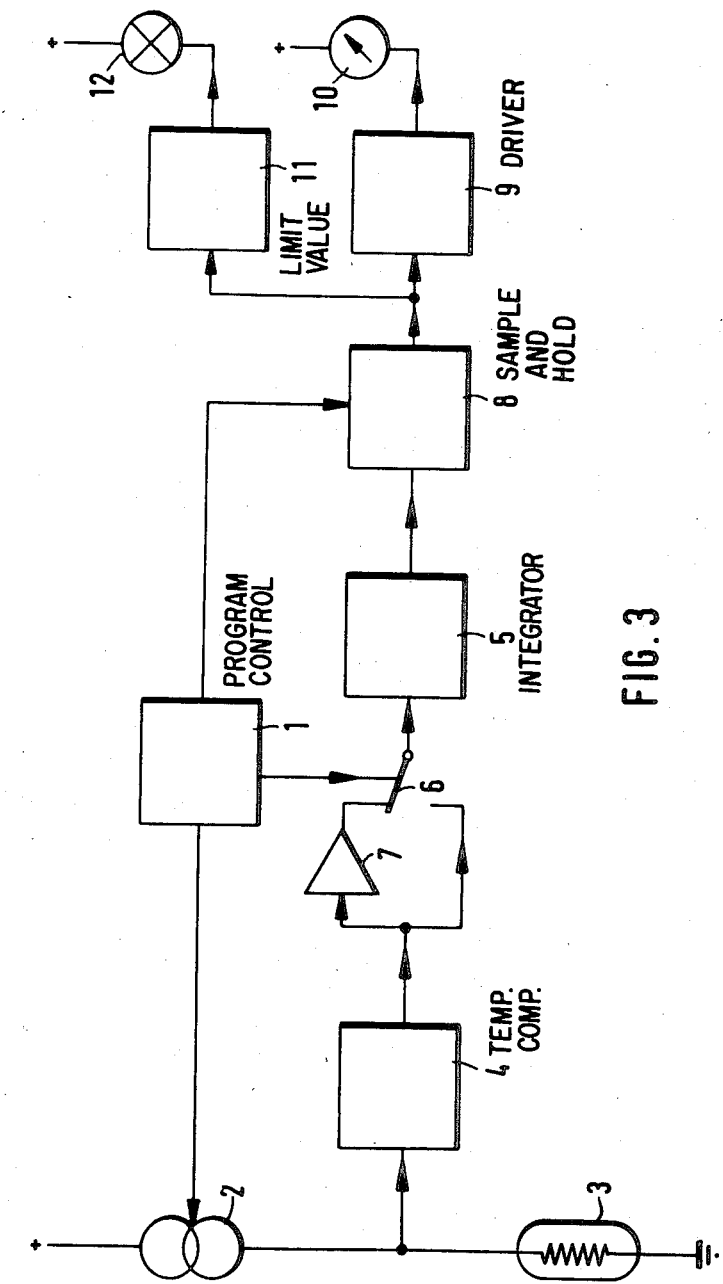
FIG. 3 is a block diagram for analog level measurement.

FIG. 3 shows a circuit for the carrying out of the method of FIGS. 1 and 2.

A program control 1 connects a source of constant current 2 for a heating time from $t_0$ to $\tau$ to a resistance probe 3. The probe voltage which drops on the resistance probe is evaluated via a block 4 for the temperature compensation, which may consist of a compensation resistor adapted to the resistance probe 3:

For this purpose, there is provided an integrator 5 which, as analog-operating integrator, may consist of an operational amplifier and a resistor/capacitor combination. The integrator is acted on by the program control 1 via a controlled switch 6 during the first half of a heating time from $t_0$ to $\tau/2$ via an inverter 7 with the substantially temperature-compensated probe voltage from block 4. The integration from $t_0$ to $\tau/2$ then takes place in the integrator. As from $\tau/2$ the controlled switch connects the integrator directly to the block 4 for the temperature compensation, so that the probe voltages which are thereupon integrated are deducted directly from the integral $t_0$ to $\tau/2$ formed during the first half of the heating time. This comparison result is stored, until the next measurement in a new measurement period, within a sample and hold circuit 8, which in its turn is controlled by the program control.

One output of the sample and hold circuit is connected to the indicating device 10 via an indication driver 9. A further connection from the output of the sample and hold circuit 8 leads to a signal lamp 12, via a limit-value detector 11.

The evaluation of discrete probe voltages in accordance with FIGS. 4 and 5 differs from the evaluation of the continuously detected probe voltages in accordance with FIGS. 1 and 2 by the following:

The discrete probe voltages $U_i$ are in each case added in the first half of the heating time from $t_0$ to $\tau/2$, j discrete probe voltages being detected. This is followed by an addition of the discrete probe voltages from j to n. From the sum which was formed with the discrete probe voltages j to n there is deducted the sum which was formed by the first discrete probe voltage up to the $j^{th}$ probe voltage.

As shown in FIG. 4 for an empty tank and in FIG. 5 for a full tank, the difference between the two said sums is again dependent on the level. Disturbing influences which affect the discrete probe voltages counteract each other at least substantially if not completely, in the same way as in the continuous integration method of FIGS. 1 and 2.

The block diagram of FIG. 6 of a device constructed with a microprocessor for the electrothermal measurement of level by the method shown in FIGS. 4 and 5 is constructed as follows:

For purposes of explanation, the same reference numbers as in FIG. 3 are used for the same parts. The source of constant current 2 is again connected to the resistance probe 3. The source of current is energized via an input protection circuit 13 in an automotive vehicle from the terminal 15 upon the turning on of the ignition. A voltage reference circuit 14 furthermore, via a bus 16, supplies power to an analog-digital converter 17, a microprocessor 18 and a digital-analog converter 19.

The microprocessor 18, since it contains a program control, in its turn controls the source of constant current 2, the analog-digital converter 17 and the digital-analog converter 19 via a line 20. The microprocessor 18 is driven by clock 21. The manner of operation of the microprocessor is controlled by a watchdog circuit 22.

Figure 6:
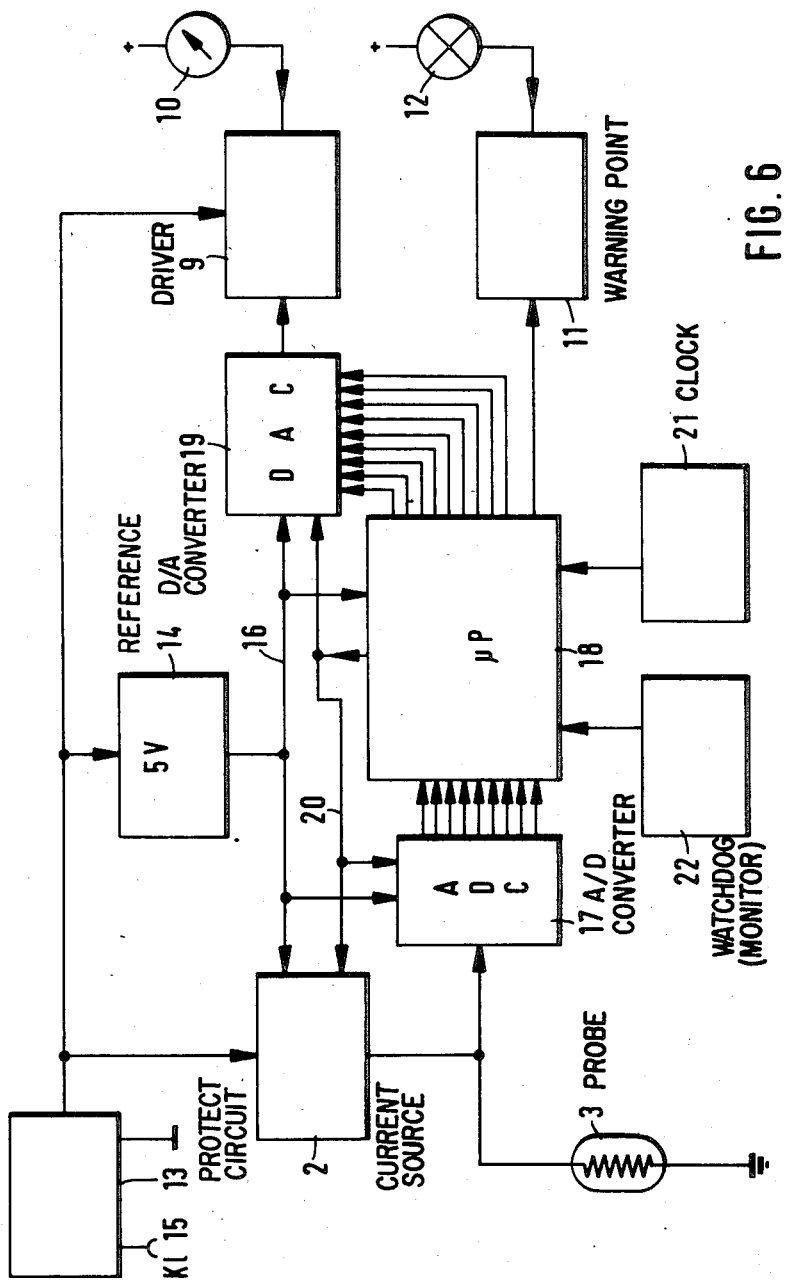
FIG. 6 is a block diagram of a digital device for the measurement of level.

The device in accordance with FIG. 6 operates in the manner that during the first half of the heating time, which is determined by the connecting of the source of constant current 2, the probe voltages are digitalized in the analog-digital converter and added in the microprocessor and stored. This takes place during the first half of the heating time from $t_0$ to $\tau/2$. During the following half of the heating time from $\tau/2$ to $\tau$, the discrete probe voltages are again digitalized and added in the microprocessor separately from the values which were determined during the first half of the heating time, and stored. From this last-mentioned sum there is deducted the previously formed sum, so that the difference of the digital discrete probe voltages j to n, minus the probe voltages 1 to j, is produced. This difference or comparative figure is again converted in the digital-analog converter into an analog indicating value and displayed, in analog fashion, via the indication driver 9 in the display device 10. For the signalling of the limit value there is again used a limit-value detector 11, which connects the signal lamp 12 when a predetermined value is exceeded by the numerical value which was determined in the microprocessor as a result of the comparison of the discrete probe voltages during in each case one-half of the heating time.

One essential advantage of the two devices according to FIGS. 3 and 6 is that, already after the first connection of the device, i.e. after the first full heating time, a relatively accurate measurement value is rapidly formed. It is therefore not absolutely necessary that several measurement values formed in this manner be averaged. However, such averaging, which is not shown in FIGS. 1 to 6, further increases the precision.

I claim:

1. A method for electrothermal measurement of liquid level, which measurement is compensated for ambient temperature and employs a resistance probe heated with a constant current during a heating time of predetermined duration, the method further employing means for timing the heating of the probe to provide a first variable derived from at least one probe voltage at the start of the heating time, said first variable being compared in the method with a second variable which is derived from at least one probe voltage at the end of the heating time in order to form a comparison variable which is approximately proportional to the liquid level, the method providing for the forming of at least one of the variables in accordance with a time function, the improvement wherein the method further comprises:

integrating a probe voltage from the start of the heating time until the middle of the heating time to reduce the effect of disturbance such as noise, etc., on the measurement;

forming the first variable from the integration of the probe voltage from the start of the heating time until the middle of the heating time;

integrating the probe voltage from the middle of the heating time until the end thereof to reduce the effect of the noise, etc., disturbances on the measurement;

forming the second variable from the integration of the probe voltages from the middle of the heating time until the end thereof; and substracting the two variables to form the difference between the first variable and the second variable, the difference being a measure of the liquid level.

2. The method according to claim 1, wherein
   the step of integrating for each variable is carried out continously during intervals of one-half of the heating time.

3. The method according to claim 2, wherein
   the step of integrating for each variable is effected by summation of discrete probe voltages.

4. The method according to claim 1, further comprising
   formation of the average value over a plurality of comparison variables.

5. In a circuit for an electrothermal measurement of liquid level compensated for ambient temperature, wherein the circuit comprises a switched source of constant current activatable by timing means for a heating time of predetermined duration and a resistance probe connected thereto, a comparator which compares a first variable derived from at least one probe voltage at the start of the heating time with a second derived from at least one probe voltage at the end of the heating time, and means for forming at least one of the two variables in accordance with a time function, the improvement wherein:

the comparator comprises an integrator for the forming of each of the two variables and said circuit further comprises a controlled switch and an inverter coupled to said controlled switch, the integrator reducing the effect of disturbances such as noise etc., on the measurement; and wherein the input of said integrator is coupled to the resistance probe via the controlled switch during a first interval from the start of the heating time until the middle of the heating time for integration of the probe voltage to produce the first variable; and wherein said integrator is further coupled to the resistance probe during a second interval from the middle of the heating time until the end thereof integration of the probe voltage to produce the second variable; and wherein said controlled switch provides for connection of said integrator via said inverter to said probe during one of said intervals, and bypasses said inverter during the other of said intervals, thereby causing said integrator to output the difference of said first and said second variables, said difference being a measure of said liquid level. end thereof for integration of the probe voltage to produce the second variable.

6. The circuit for an electrothermal measurement of liquid level according to claim 5, further comprising
   an inverter, and wherein the input of said integrator during alternate one-half intervals of the heating time is to be coupled to the resistance probe via said inverter; and
   said integrator being coupled directly to the resistance probe during the remaining other half intervals of the heating time to permit the integrator to provide the function of a comparator.

7. The circuit for an electrothermal measurement of liquid level according to claim 5, further comprising
   an analog-digital converter, and an adder; and wherein
   said resistance probe is connected via the analog-digital converter to the adder for the formation and the addition of discrete digitalized probe voltages during each one-half interval of the heating time.

* * * * *